(12) United States Patent
Yasui

(10) Patent No.: US 6,223,608 B1
(45) Date of Patent: May 1, 2001

(54) TORQUE DETECTOR

(75) Inventor: Katsuaki Yasui, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/197,532

(22) Filed: Nov. 23, 1998

(30) Foreign Application Priority Data

Jun. 2, 1998 (JP) ................................. 10-152987

(51) Int. Cl.$^7$ ........................................................ G01L 3/02
(52) U.S. Cl. ................................................... 73/862.333
(58) Field of Search ........................ 73/862.331, 862.332, 73/862.333, 862.334, 862.335, 862.336, 862.193, 862.321–862.329, 862.08, 862.131; 336/30, 84 C, 79, 81; 340/870.31

(56) References Cited

U.S. PATENT DOCUMENTS

| 4,503,713 | * | 3/1985 | Obayashi et al. | 73/862.34 |
| 4,660,669 | * | 4/1987 | Shimizu | 180/79.1 |
| 4,743,817 | * | 5/1988 | Shimizu | 318/488 |
| 4,805,463 | * | 2/1989 | Kelledes et al. | 73/862.33 |
| 5,009,110 | | 4/1991 | Lang et al. | 73/862.33 |
| 5,046,372 | * | 9/1991 | Taniguchi et al. | 73/862.33 |
| 5,115,685 | | 5/1992 | Jorgensen et al. | 73/862.33 |

FOREIGN PATENT DOCUMENTS

| 195 33 152 C1 | 3/1997 | (DE) . |
| 0003205526 | 9/1991 | (JP) . |
| 0004212030 | 8/1992 | (JP) . |
| 0009072795 | 3/1997 | (JP) . |
| 0011264779 | 9/1999 | (JP) . |

* cited by examiner

Primary Examiner—Max Noori
Assistant Examiner—Abdullahi Aw-Musse
(74) Attorney, Agent, or Firm—Sughrue, Mion, Zinn, Macpeak & Seas, PLLC

(57) ABSTRACT

A torque detector is provided with movable magnetic elements each comprising: an element body, which deforms elastically in response to relative shear displacement between the surfaces of an upper shaft and a lower shaft; and soft ferromagnetic wings, which are supported by the element body and change their inclination relative to the axial direction due to the elastic deformation of the element body, the inclination of the wings being detected by coils.

11 Claims, 4 Drawing Sheets

FIG. IA
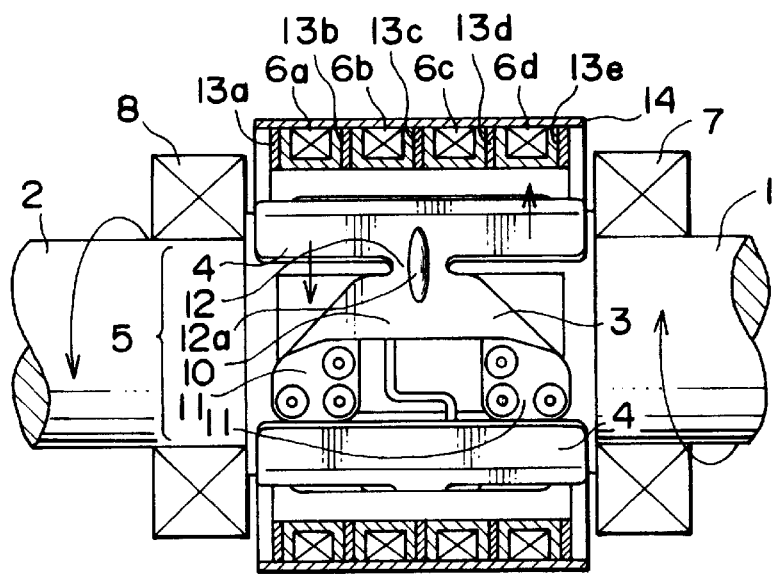
FIG. IB
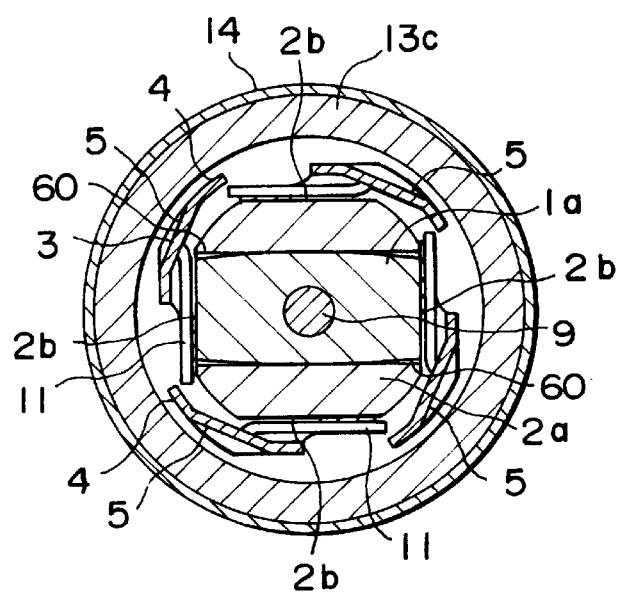

TORQUE DETECTOR

BACKGROUND OF THE INVENTION

1. Field of the Invention

The present invention relates to a torque detector for detecting torque without direct contact when an external force is applied to the rotating shaft of an automobile power-steering mechanism, etc.

2. Description of the Related Art

In an automobile power-steering mechanism, it is necessary to detect the amount of torque being applied to the steering wheel to determine the amount of power assistance required. Torque detectors for this purpose have been proposed, such as that disclosed in Utility Model Laid Open No. 1-180737, for example.

As shown in FIG. 6, the torque detector comprises: an upper shaft 101, which is attached to a steering wheel (not shown); a lower shaft 102, which is attached to the pinion gear of a steering mechanism (not shown); a torsion bar 103, which is disposed on the central axis of the upper shaft 101 and the lower shaft 102 and is connected to the two shafts so as to be elastic in the direction of twisting; a case 105, which rotatably supports the upper shaft by means of a bearing 104; a bobbin 106, which is disposed within the case 105; first and second movable magnetic cylinders 107, 108, which are composed of soft ferromagnetic material and are secured to the upper shaft; third and fourth movable magnetic cylinders 109, 110, which are composed of soft ferromagnetic material and are secured to the lower shaft; and first to fourth coils 111, 112, 113, 114, which are wound around the bobbin within the case 105.

The first and third movable magnetic cylinders 107, 109 sit side by side in the axial direction and first and third toothed portions 107a, 109a are disposed in the respective facing edges. The first coil 111 is disposed so as to surround these toothed portions. The second and fourth movable magnetic cylinders 108, 110 also sit side by side in the axial direction and second and fourth toothed portions 108a, 110a are disposed in the respective facing edges. The second coil 112 is disposed so as to surround these toothed portions. The third and fourth coils 113, 114 are disposed so as to surround the third and fourth movable magnetic cylinders 109, 110, which are secured to the lower shaft 102.

Next, the operation of the above conventional example will be explained. When torque is applied to the upper shaft 101 by the steering wheel, torsional deformation occurs in the torsion bar 103, and angular shear occurs between the first movable magnetic cylinder 107 and the third movable magnetic cylinder 109 and between the second movable magnetic cylinder 108 and the fourth movable magnetic cylinder 110, which are attached to the upper shaft 101 and the lower shaft 102, respectively.

Firstly, to explain the operation between the first and third movable magnetic cylinders 107, 109, the surface area of the overlap which forms a magnetic circuit between the first and third toothed portions 107a and 109a disposed on each of the movable magnetic cylinders changes, resulting in a change in the inductance in the first coil 111. The torque can be determined by detecting the change in inductance by means of a detection circuit (not shown). However, the inductance in the first coil 111 is changed not only by torque but also by temperature, and temperature is compensated for by detecting the inductance in the third coil 113, whose inductance is not affected by the twisting of the torsion bar 103.

The operation between the second and fourth movable magnetic cylinders 108, 110 is identical, so that the surface area of the overlap between the second and fourth toothed portions 108a and 110a changes, resulting in a change in the inductance in the second coil 112. The torque is determined by detecting the change in inductance. Temperature is compensated for by detecting the inductance in the fourth coil 114.

Thus, this dual construction comprising a first detection set comprising the first and third movable magnetic cylinders 107, 109 and the first and third coils 111, 113, and a second detection set, which is capable of exactly the same measurements, comprising the second and fourth movable magnetic cylinders 108, 110 and the second and fourth coils 112, 114, performs a dual safety function which enables the system to operate on the output of one of the detection sets when the other malfunctions, such as by wire breakage, etc.

The conventional torque detector requires a torsion bar 103, which is an elastic member which deforms in proportion to the torque, in addition to the first to fourth movable magnetic cylinders 107 to 110, which change the inductance in the first and second coils 111, 112, and the large number of parts makes the construction complicated.

Also, each of the toothed portions 107a to 110a on the first to fourth movable magnetic cylinders 107 to 110 are of complicated shape and require manufacture by cutting, and manufacture is therefore troublesome and expensive.

In addition, simultaneous provision of a temperature compensation function and a dual safety function, which guards against wire breakage in the coils, etc., basically requires four coils. The conventional example required two pairs of movable magnetic cylinders provided with toothed portions corresponding to the four coils.

SUMMARY OF THE INVENTION

The present invention aims to solve the above problems and an object of the present invention is to provide a torque detector which can detect torque by means of a simple construction.

To this end, according to the present invention, there is provided a torque detector comprising: a first shaft and a second shaft, which are acted on mutually by a torque; movable magnetic elements, each of which includes an element body, which spans a gap between the first shaft and the second shaft, is secured to the surface of the first shaft and the surface of the second shaft, and deforms elastically in response to the relative displacement between the surface of the first shaft and the surface of the second shaft, which arises as result of relative turning between the first shaft and the second shaft, and soft ferromagnetic wings, which are supported by the element body and change their inclination relative to the axial direction due to the elastic deformation of the element body; and coils which are disposed radially outwards from the wings of the movable magnetic elements, are spaced at specific intervals, and electromagnetically detect the inclination of the wings.

BRIEF DESCRIPTION OF THE DRAWINGS

FIG. 1A is a partial cross-section of the front elevation of the torque detector according to Embodiment 1 of the present invention;

FIG. 1B is a cross-section of the central portion of an end elevation of the torque detector according to Embodiment 1 of the present invention;

DETAILED DESCRIPTION OF THE PREFERRED EMBODIMENTS

Embodiment 1

Figure 2:
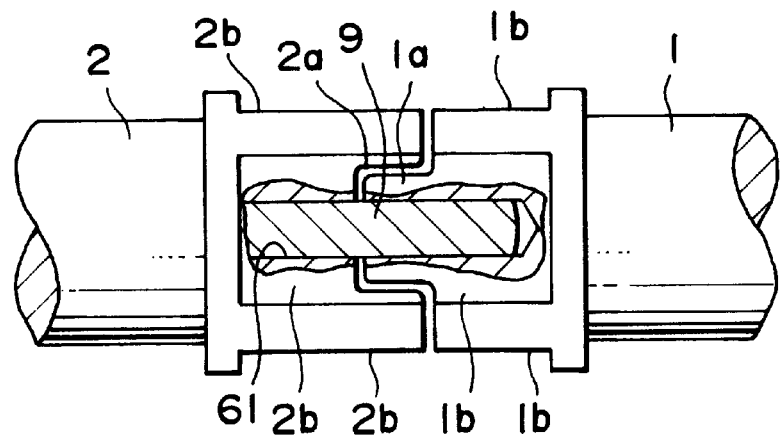
FIG. 2 is a partial cross-section of the link portion between the first shaft and the second shaft of the torque detector according to Embodiment 1 of the present invention.

FIG. 1A is a partial cross-section of the front elevation of the torque detector according to Embodiment 1 of the present invention, and FIG. 1B is a cross-section of the central portion of an end elevation thereof.

The torque detector according to Embodiment 1 comprises: an upper shaft 1 as a first shaft and a lower shaft 2 as a second shaft, which are acted on mutually by a torque; movable magnetic elements 5, each of which includes an element body 3, which spans the gap between the upper shaft 1 and the lower shaft 2, is secured to the surface of the upper shaft 1 and the surface of the lower shaft 2, and deforms elastically in response to the relative shear displacement between the surface of the upper shaft 1 and the surface of the lower shaft 2, which arises as result of relative turning between the upper shaft 1 and the lower shaft 2, and soft ferromagnetic wings 4, which are supported by the element body 3 and change their inclination relative to the axial direction due to the elastic deformation of the element body; and first to fourth coils 6a, 6b, 6c, 6d, which are disposed radially outwards from the wings 4 of the movable magnetic elements 5, are spaced at specific intervals, and comprise coils for electromagnetically detecting the inclination of the wings 4.

The element bodies 3 themselves of the movable magnetic elements 5 function as elastic members which twist and deform in proportion to the torque acting between the upper shaft 1 and the lower shaft 2, and it is possible to detect the torque by means of the movable magnetic elements 5 alone and thereby simplify the construction. The conventional torsion bar is no longer required.

The upper shaft 1 may be attached to a steering wheel, and the lower shaft 2 may be attached to the pinion gear of a steering mechanism, and each is rotatably supported by bushes 7, 8.

FIG. 2 is a partial cross-section of the link portion between the upper shaft and the lower shaft. A protruding portion 1a is disposed on the end surface of the upper shaft 1 and a recessed portion 2a is disposed on the end surface of the lower shaft 2, and these interlock so that relative rotation greater than a certain angle is not possible and a gap 60 is formed between the sides of the protruding portion 1a and the recessed portion 2a, as shown in FIG. 1B. A connecting shaft 9 is disposed in holes 61 disposed in the center of both the upper shaft 1 and the lower shaft 2 to prevent the upper shaft 1 and lower shaft 2 from rotating away from each other.

Four flat surface portions 1b, 2b are disposed at 90 degree intervals around the circumference of the link portion between the upper shaft 1 and the lower shaft 2, and one movable magnetic element 5 is disposed on each of these flat surface portions 1b, 2b so as to span the gap between the upper shaft 1 and the lower shaft 2.

Each of the movable magnetic elements 5 is manufactured by pressing the entire element, including the element body 3 and the wings 4, from a single sheet of soft ferromagnetic material composed of permalloy. Other materials which can be used to make the movable magnetic elements 5 include iron, silicon steel, etc. Compared to the frequent use of cutting required by the conventional example, formation by pressing can reduce the number of processing steps significantly and therefore reduce manufacturing costs significantly.

Each of the element bodies 3 comprises a trunk portion 10, which extends in the axial direction, and stay portions 11, which are formed by bending both ends of the trunk portion 10 and which are secured to the upper shaft 1 and the lower shaft 2. The wings 4 are disposed parallel to the trunk portion 10, extend in the axial direction, and are connected to the middle of one edge of the trunk portion 10 by means of a neck portion 12. The shape of the trunk portion 10 is approximately trapezoidal with the narrow end towards the wings 4, so that force is concentrated at the end of the neck portion 12, which supports the wings 4, enabling a greater displacement in the inclination of the wings 4 relative to the axial direction. Moreover, due to the principle of leverage, the narrower the narrow end of the trapezoidal trunk portion 10 (the width of the neck portion 12) the greater the displacement of the wings 4. The neck portion 12a is strengthened by crimping 12a.

Figure 3:
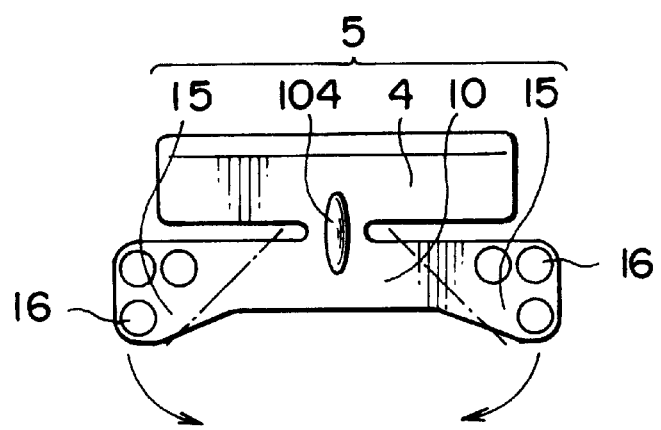
FIG. 3 is an expanded view of a movable magnetic element of the torque detector according to Embodiment 1 of the present invention.

The stay portions 11 are formed by folding the tab portions 15, which are disposed at both ends of the trunk portion 10, along the broken fold lines as shown in FIG. 3, back into the page and downwards, so that they lie in the position shown in FIG. 1A. Three protrusions 16 (FIG. 3) are disposed on each of the tab portions 15, and these protrusions 16 are secured by projection welding to the flat surface portions 1b, 2b on the upper shaft 1 and the lower shaft 2, respectively.

The first to fourth coils 6a, 6b, 6c, 6d are each wound so as to surround the shafts and are disposed side by side in the axial direction with ring shaped yokes 13a, 13b, 13c, 13d, 13e, which are disposed between and to either side of each of the coils 6a, 6b, 6c, 6d so as to separate each of the coils 6a, 6b, 6c, 6d. A cylindrical yoke 14 is disposed around the outside of the first to fourth coils 6a, 6b, 6c, 6d and the ring shaped yokes 13a, 13b, 13c, 13d, 13e so as to envelop them.

The first to fourth coils 6a, 6b, 6c, 6d are wound so as to surround the wings 4 of the movable magnetic elements 5 centered on the upper shaft 1 and the lower shaft 2 within the length of the wings 4 in the axial direction. The first coil 6a and the third coil 6c, which are each separated by a prescribed distance from each other in the axial direction, constitute a coil pair, and the second coil 6b and the fourth coil 6d constitute another coil pair, so that the torque is detected in duplicate.

Figure 4:
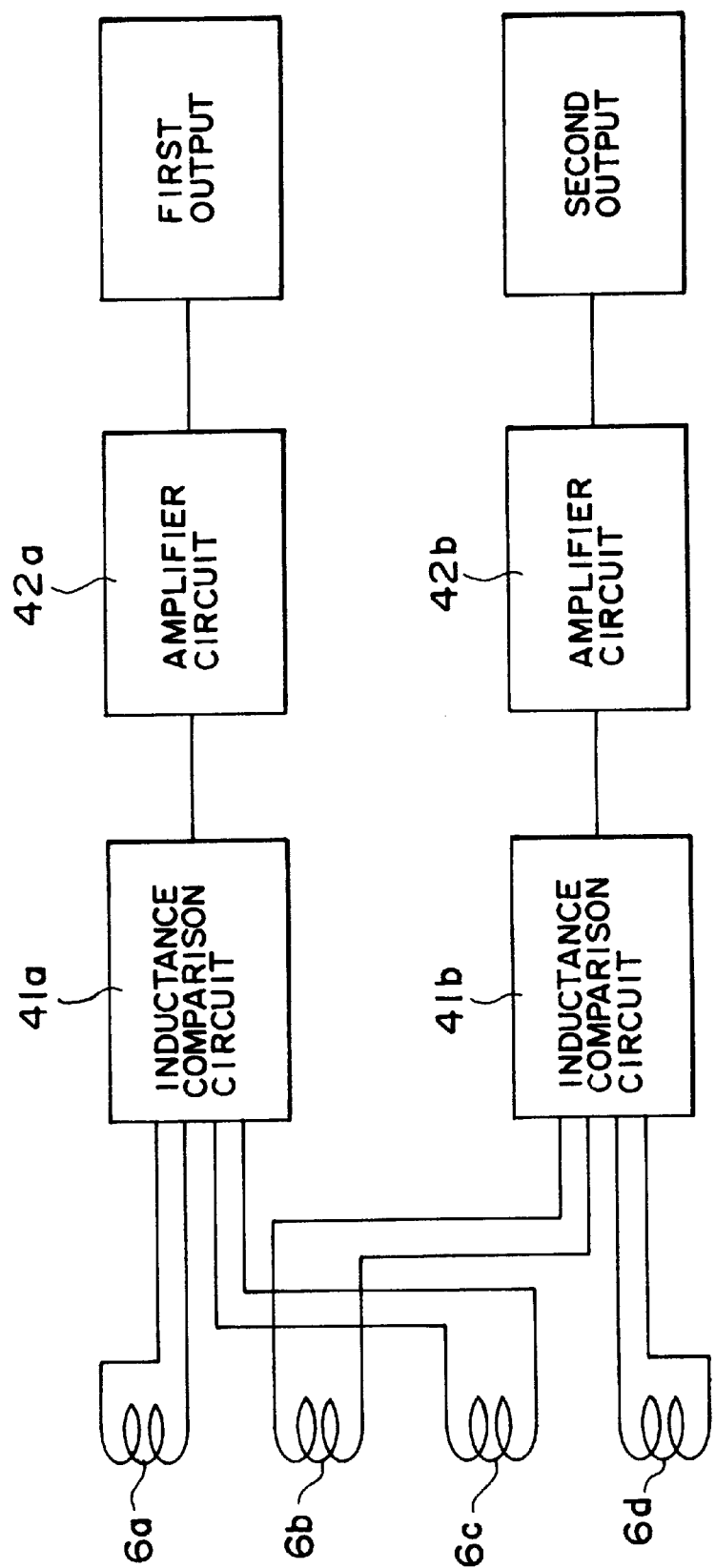
FIG. 4 is a block diagram of the circuit of the torque detector according to Embodiment 1 of the present invention.

FIG. 4 is a block diagram of the circuit of the torque detector according to the present invention.

The first and third coils 6a, 6c are connected to an inductance comparison circuit 41a, and also to an amplifier circuit 42a. The second and fourth coils 6b, 6d are connected to an inductance comparison circuit 41b, and also to an amplifier circuit 42b.

Next, the operation of the embodiment will be explained. When a torque is applied to the upper shaft 1 by the steering wheel, a relative displacement in the turning direction occurs on the surfaces of the shafts at the link portion between the upper shaft 1 and the lower shaft 2. The movable magnetic elements 5, which act as elastic members, are connected to both shafts, so that the magnitude of their relative displacement is proportional to the magnitude of the torque applied. The inclination of the wings 4 on the movable magnetic elements 5 changes according to the relative displacement of the movable magnetic elements 5, so that the magnitude of the applied torque can be determined by detecting the inclination electromagnetically by means of the first to fourth coils 6a, 6b, 6c, 6d.

For example, when a clockwise torque is applied to the upper shaft 1, the wings 4 closer to the upper shaft on all four movable magnetic elements 5 are raised (radially outwards) and the wings 4 closer to the lower shaft 2 are lowered (radially inwards), due to the twisting of the trunk portions 10 of the element bodies 3. Thus, the distance between the yokes 13d, 13e and the wings 4 on the upper shaft side decreases and the inductance in the third and fourth coils 6c, 6d on the upper shaft side increases. At the same time, the distance between the yokes 13a, 13b and the wings 4 on the lower shaft side increases and the inductance in the first and second coils 6a, 6b on the lower shaft side decreases. Consequently, if neither temperature compensation function nor dual safety function is to be provided, the torque can be determined by measuring the change in inductance in any one coil. But, in practice it is necessary to compensate for temperature changes in the sensor outputs, and temperature compensation is performed by comparing the output from the coil pair comprising the first and third coils 6a, 6c with the output from the coil pair comprising the second and fourth coils 6b, 6d by means of the inductance comparison circuits 41a, 41b to offset the changes in inductance due to temperature changes in the coils 6a, 6b, 6c, 6d.

In this example, the inductance due to the torque is greater in the third coil 6c than in the first coil 6a, and by comparing these inductances in the inductance comparison circuit 41a and amplifying the difference in the amplifier circuit 42a, a first output can be obtained which is temperature-compensated and corresponds to the torque.

Similarly, using the second and fourth coils 6b, 6d, the inductance comparison circuit 41b, and the amplifier circuit 42b, which form a system which functions in the same way, a second output can be obtained which is also temperature-compensated and corresponds to the torque.

Thus, a dual safety function is ensured, whereby one output can be used as a backup to the other if a malfunction, such as wire breakage, etc., occurs in either system.

If an extremely large torque is applied to the upper shaft 1, the movable magnetic elements 5 will be damaged, and the protruding portion 1a in the upper shaft 1 and the recessed portion 2a in the lower shaft 2 are therefore mutually interlocked so that rotation greater than a certain angle is not possible, thus preventing damage to the movable magnetic elements 5.

Embodiment 2

Figure 5:
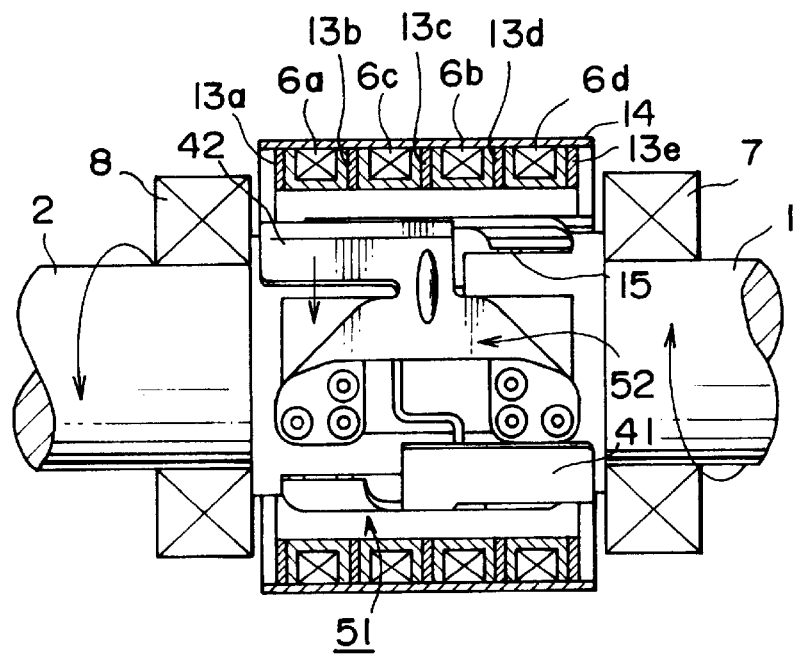
FIG. 5 is a partial cross-section of the front elevation of the torque detector according to Embodiment 2 of the present invention.
Figure 6:
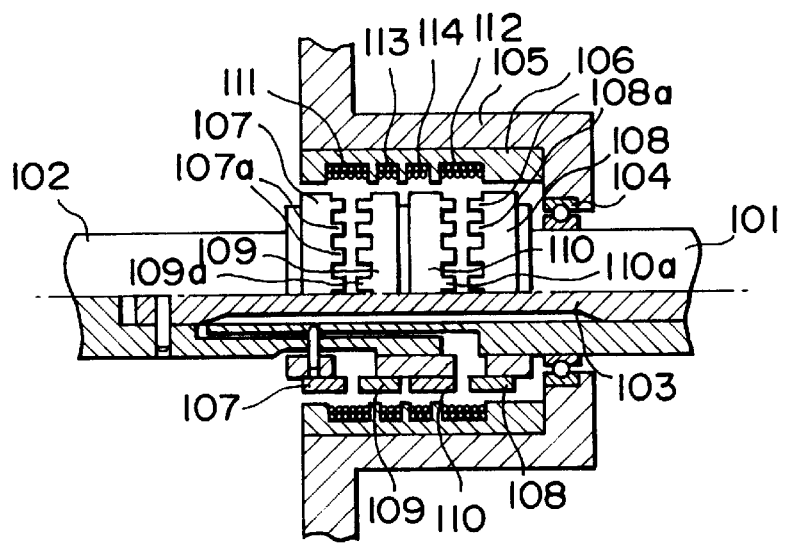
FIG. 6 is a partial cross-section of the front elevation of a conventional torque detector.

FIG. 5 shows a partial cross-section of the front elevation of the torque detector according to Embodiment 2 of the present invention. In the following explanation, only the portions different from Embodiment 1 will be explained, and identical parts will be given identical numbers and further explanation thereof will be omitted.

In this embodiment, the four movable magnetic elements comprise: two first movable magnetic elements 51, which each have a wing 41 on the side closer to the upper shaft 1; and two second movable magnetic elements 52, which each have a wing 42 on the side closer to the lower shaft 2. A coil pair comprising the second and fourth coils 6b, 6d is disposed within the length of the wings 41 of the first movable magnetic elements 51 in the axial direction, and a coil pair comprising the first and third coils 6a, 6c is disposed within the length of the wings 42 of the second movable magnetic elements 52 in the axial direction. In this embodiment, the positions of the second coil 6b and the third coil 6c have been reversed compared to Embodiment 1.

Embodiment 1 has a dual safety function with respect to wire breakage in the coils because the length of the wings 4 of the movable magnetic elements 5 in the axial direction is spread to cover all of the first to fourth coils 6a, 6b, 6c, 6d. However, if even one of the movable magnetic elements 5 malfunctions due to deformation, etc., the inductance in all of the coils will be affected, and Embodiment 1 therefore does not have dual safety function with respect to deformation of the movable magnetic elements 5.

Dual safety function with respect to deformation of the movable magnetic elements is imparted to Embodiment 2 by forming two independent detector sets in which the first movable magnetic elements 51, which each have a wing 41 on the side closer to the upper shaft 1, only affect the two coils 6b, 6d on the side closer to the upper shaft 1, and the second movable magnetic elements 52, which each have a wing 42 on the side closer to the lower shaft 2, only affect the two coils 6a, 6c on the side closer to the lower shaft 2.

Embodiment 3

In Embodiments 1 and 2, the movable magnetic elements are constructed as single units, but materials with superior magnetic properties generally lack mechanical strength, and therefore the element bodies may be made of a strong material and the wings only, which require magnetic properties, may be made of soft ferromagnetic material. The element bodies and wing bodies may also be formed from a single sheet of metal, and a high-performance soft ferromagnetic material, such as amorphous magnetic metal foil, etc., may be secured to the surface of the wing bodies to form the wings. Or the element bodies and wing bodies may be formed from a single sheet of soft ferromagnetic material, as in Embodiment 1, and a high-performance soft ferromagnetic material may be secured to the surface of the wing bodies to improve the magnetic properties of Embodiment 1 even further. This makes the construction slightly more complicated, but enables strength and precision to be improved.

Embodiments 1 and 2 rely only upon the movable magnetic elements to function as elastic members, but if their strength is insufficient, a torsion bar may also be provided.

Embodiments 1 and 2 use inductance comparison circuits to detect the inclination of the wings in the axial direction, but any electromagnetic method using coils may be used, including methods such as differential transduction, detecting reactance due to eddy currents, etc.

As explained above, according to the present invention, a torque detector comprising: a first shaft and a second shaft, which are acted on mutually by a torque; movable magnetic elements, each of which includes an element body, which spans a gap between the first shaft and the second shaft, is secured to the surface of the first shaft and the surface of the second shaft, and deforms elastically in response to the relative displacement between the surface of the first shaft and the surface of the second shaft, which arises as result of relative turning between the first shaft and the second shaft, and soft ferromagnetic wings, which are supported by the element body and change their inclination relative to the axial direction due to the elastic deformation of the element body; and coils, which are disposed radially outwards from the wings of the movable magnetic elements, are spaced at specific intervals, and electromagnetically detect the inclination of the wings. Therefore, the element bodies of the movable magnetic elements themselves function as elastic members which twist and deform in proportion to the torque acting between the upper shaft and the lower shaft, and it is possible to detect the torque by means of a single movable magnetic element alone and thereby simplify the construction. Also, the conventional torsion bar is no longer required, enabling the number of parts to be reduced.

The torque detector, wherein a pair of coils, which may be wound so as to surround the wings of the movable magnetic elements centered on the first shaft and the second shaft within the length of the wings in the axial direction, may be disposed so as to be separated by a prescribed distance from each other in the axial direction, and temperature compensation may be performed by measuring the difference in the output from the pair of coils. Therefore the effects of temperature change can be eliminated by measuring the difference between coil outputs, so that there is no need to provide a separate coil for temperature compensation as conventionally required.

The torque detector, wherein a plurality of the pairs of coils may be provided. Therefore, if wire breakage occurs in one pair of coils, the torque can be detected in the remaining pair of coils, so that a multiple safety function can be provided by a single movable magnetic element.

The torque detector, wherein a plurality of the movable magnetic elements may be disposed around the circumference of the first shaft and the second shaft. Therefore, the sensitivity of detection is increased.

The torque detector, wherein the plurality of movable magnetic elements may comprise: first movable magnetic elements, which each have a wing on the side closer to the first shaft; and second movable magnetic elements, which each have a wing on the side closer to the second shaft; and is provided with: at least one pair of coils disposed within the length of the wings of the first movable magnetic elements in the axial direction; and at least one pair of coils disposed within the length of the wings of the second movable magnetic elements in the axial direction. Therefore, if either the first or second movable magnetic elements in a plurality of movable magnetic elements is deformed, the torque can be detected by means of the remaining set of movable magnetic elements and one pair of coils, and therefore a dual safety function with respect to deformation of the movable magnetic elements is imparted.

The torque detector, wherein the element bodies and the wings may be formed as a single unit from a single sheet of soft ferromagnetic material. Therefore, formation can be performed by pressing and, the number of processing steps can be reduced significantly compared to the frequent use of cutting required by the conventional example, therefore enabling manufacturing costs to be reduced significantly.

The torque detector, wherein the element bodies and the wings may be connected by means of a neck portion and the neck portion may be crimped. Therefore, the strength of the neck portion can be increased.

The torque detector, wherein the element bodies may be formed from a strong material, and wing bodies may be formed separately from said element bodies from a soft ferromagnetic material. Therefore, stronger materials can be used in the element bodies and materials with better magnetic properties can be used in the wings, enabling properties such as strength and precision to be improved.

The torque detector, wherein the element bodies and wing bodies may be formed as a single unit from a single sheet of metal, and the wings may be formed by securing a soft ferromagnetic material to the wing bodies. Therefore, strength and precision can be improved.

The torque detector, wherein each of the element bodies may comprise: a trunk portion, which extends in the axial direction; and stay portions, which are formed by folding both ends of the trunk portion and which are secured to the first and second shafts; wherein the wings may be disposed parallel to the trunk portion, extend in the axial direction, and may be connected to the middle of one edge of the trunk portion. Therefore, formability is improved.

The torque detector, wherein the trunk portion may be formed in an approximately trapezoidal shape with the narrow end towards the wings. Therefore, force is concentrated in the portion which connects the wings, enabling the magnitude of the displacement of the wings to be increased.

What is claimed is:

1. A torque detector comprising:
   a first shaft and a second shaft;
   movable magnetic elements, each of which includes:
      an element body, which spans a gap between said first shaft and said second shaft, is secured to a surface of said first shaft and a surface of said second shaft, and deforms elastically in response to a relative displacement between the surface of said first shaft and the surface of said second shaft, which arises as result of relative turning between said first shaft and said second shaft;
      and soft ferromagnetic wings, which are supported by said element body and change their inclination relative to an axial direction due to the elastic deformation of said element body; and
   coils, which are disposed radially outwards from said wings of said movable magnetic elements, are spaced at specific intervals, and electromagnetically detect said inclination of said wings.

2. The torque detector according to claim 1, wherein a pair of coils, which are wound so as to surround said wings of said movable magnetic elements centered on said first shaft and said second shaft within the length of said wings in the axial direction, are disposed so as to be separated by a prescribed distance from each other in the axial direction, and temperature compensation is performed by measuring a difference in the output from the pair of coils.

3. The torque detector according to claim 2, wherein a plurality of said pairs of coils is provided.

4. The torque detector according to claim 1, wherein a plurality of said movable magnetic elements is disposed around the circumference of said first shaft and said second shaft.

5. The torque detector according to claim 4, wherein said plurality of movable magnetic elements comprises:
   first movable magnetic elements, which each have a wing on a side closer to said first shaft; and
   second movable magnetic elements, which each have a wing on a side closer to said second shaft;
   and is provided with:
      at least one pair of coils disposed within the length of the wings of said first movable magnetic elements in the axial direction; and
      at least one pair of coils disposed within the length of the wings of said second movable magnetic elements in the axial direction.

6. The torque detector according to claim 1, wherein said element bodies and said wings are formed as a single unit from a single sheet of soft ferromagnetic material.

7. The torque detector according to claim 1, wherein said element bodies and said wings are connected by means of a neck portion and said neck portion is crimped.

8. The torque detector according to claim 1, wherein said element bodies are formed from a strong material, and wing bodies are formed separately from said element bodies from a soft ferromagnetic material.

9. The torque detector according to claim 1, wherein said element bodies and wing bodies are formed as a single unit from a single sheet of metal, and said wings are formed by securing a soft ferromagnetic material to said wing bodies.

10. The torque detector according to claim 1, wherein each of said element bodies comprises:
   a trunk portion, which extends in the axial direction; and
   stay portions, which are formed by folding both ends of said trunk portion and which are secured to said first and second shafts;
   wherein said wings are disposed parallel to said trunk portion, extend in the axial direction, and are connected to the middle of one edge of said trunk portion.

11. The torque detector according to claim 10, wherein said trunk portion is formed in an approximately trapezoidal shape with the narrow end towards the wings.

* * * * *